(12) United States Patent
Huang et al.

(10) Patent No.: US 7,474,630 B2
(45) Date of Patent: Jan. 6, 2009

(54) COORDINATED CONVERGECAST FOR AD HOC WIRELESS NETWORKS

(75) Inventors: Qingfeng Huang, Mountain View, CA (US); Ying Zhang, Cupertino, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 846 days.

(21) Appl. No.: 11/005,019

(22) Filed: Dec. 7, 2004

(65) Prior Publication Data

US 2006/0120371 A1    Jun. 8, 2006

(51) Int. Cl.
*H04L 12/28* (2006.01)
*H04Q 7/24* (2006.01)
(52) U.S. Cl. .................. 370/254; 370/338; 370/389
(58) Field of Classification Search .............. None
See application file for complete search history.

(56) References Cited

U.S. PATENT DOCUMENTS

| 7,327,683 | B2* | 2/2008 | Ogier et al. | 370/236 |
| 2004/0073933 | A1* | 4/2004 | Gollnick et al. | 725/81 |
| 2006/0067213 | A1* | 3/2006 | Evans et al. | 370/229 |
| 2008/0112387 | A1* | 5/2008 | Gandham et al. | 370/345 |

OTHER PUBLICATIONS

Woo et al, "Networking Support for Query Processing in Sensor Networks", Jun. 2004, Communications of the ACM, vol. 47, No. 6, pp. 47-52.*
Kulkarni et al, "TDMA Service for Sensor Networks", Mar. 24, 2004, Distributed Computing Systems Workshops, 2004. Proceedings. 24th International Conference on, pp. 1-6.*
Wan, et al, "CODA: Congestion Detection and Avoidance in Sensor Networks", Nov. 7, 2003, SenSys '03, ACM, pp. 266-279.*
Choi et al, "Routing on a Logical Grid in Sensor Networks", 2004, UTCS Technical Report TR-04-49, pp. 1-28.*
Simon et al, "Sensor Network-Based Countersniper System", Sep. 2004, SenSys '04, ACM, pp. 1-12.*
Huang et al, "Radial Coordination for Convergecast in Wireless Sensor Networks", Nov. 2004, IEEE, LCN'04, pp. 1-8.*

\* cited by examiner

*Primary Examiner*—Wing F Chan
*Assistant Examiner*—Robert C Scheibel
(74) *Attorney, Agent, or Firm*—Oliff & Berridge, PLC

(57) ABSTRACT

A network routing method and system may include initializing the network by determining, for each node of the network, a number of hops to a root node and delaying forwarding to the root node, for each node, a packet received, wherein the delay in forwarding the packet received to the root node from a forwarding node depends upon the number of hops separating the root node from the forwarding node. A network routing method and system may include initializing the network by determining, for each node of the network, a number of hops to a root node, determining, for a forwarding node that receives a packet from a sending node, whether to forward the packet to a root node, determining a delay after which the packet is to be forwarded to the root node and determining a probability of forwarding the packet to the root node.

19 Claims, 5 Drawing Sheets

COORDINATED CONVERGECAST FOR AD HOC WIRELESS NETWORKS

This invention was made with U.S. Government support awarded by the Advance Research Projects Agency (ARPA) of the Department of Defense. The U.S. Government has certain rights in this invention, including the right in limited circumstances to require the patent owner to license others on reasonable terms as provided for by the terms of Contract No. F33615-01-C-1904.

BACKGROUND

1. Field

This disclosure relates to networks, and more particularly to routing methods in convergecast networking.

2. Description of Related Art

Many sensor network applications require broadcast and convergecast for data dissemination or collection. Convergecast generally refers to a communication pattern in which the flow of data takes place from a set of nodes toward a single node in a network. Convergecast can be viewed as the opposite of broadcast or multicast, in which the flow of data takes place from a single node to a set of nodes in the network. FIG. 1 is a simple example that illustrates the characteristics of both broadcast and convergecast in a network. On the left-hand side is a broadcast example in which node A is the message source and nodes B, C, D are the expected recipients. Node B hears or receives node A's message directly, and forwards a copy of the message to nodes C and D. On the right-hand side is a convergecast example in which node A is the destination node. Nodes B, C, and D each have a message destined to node A. In this example, node B serves as the forwarding node, which is a relay node for nodes C and D.

The issue of designing efficient and reliable broadcast protocols for wireless ad hoc networks has received much attention in recent years. However, the issue of convergecast has only rarely been addressed. At first glance, it may appear that convergecast is the reverse process of broadcast. However, there is at least one critical difference between convergecast and broadcast that makes convergecast more than merely the reverse process of broadcast. In broadcast, the data being disseminated is identical for all recipients. As a result, the data only needs to traverse any edge in the network at most once, and the bandwidth utilization for broadcast process is essentially uniform across the entire network. On the other hand, convergecast is a many-to-one process wherein the data flowing to the recipient from different nodes are likely to be different. The result generally is a non-uniform bandwidth demand across the network because, for example, more bandwidth is needed for nodes closer to the sink, as seen in the illustration of FIG. 1. In the convergecast process illustrated in FIG. 1, the edge BA is traversed by three packets while edges CB and DB are traversed by only one packet.

It should be noted that in wireless networks, collision is a major adversary to communication reliability, and wastes resources (energy, bandwidth, time). Collisions generally occur when multiple nodes simultaneously transmit over the same channel to the same node, or when a receiver is in the range of another transmission over the same channel. Many schemes, especially Media Access Control (MAC) level ones, such as Carrier-Sense-Multiple-Access (CSMA), Carrier-Sense-Multiple-Access with Collision Avoidance (CSMA/CA), Frequency-Division Multiple Access (FDMA), Code-Division-Multiple-Access (CDMA), Time-Division-Multiple-Access (TDMA), have been proposed and used to reduce collisions in wireless communication. The concern for simplicity and scalability for large scale wireless sensor networks has led to the adoption of CSMA and its close variants such as the MAC layer strategies in the popular Mica mote platform.

SUMMARY

It is generally known that, in theory, in a CSMA type scheme, the packet loss ratio increases when the load on a link increases. This fact points to a problem in convergecast, which is that without proper data flow control or coordination, the high contention at the bottleneck could dramatically increase packet loss and reduce the reliability of convergecast. Generally, the sink nodes are inevitably bottlenecks in convergecast. In a large-scale wireless network, this bottleneck phenomenon in convergecast potentially impacts the reliability and throughput of the network.

It should be pointed out that the nodes of the network may be very similar, or even identical, in nature and structure, but that their function determines their labeling in the following description. Accordingly, when a node sends a packet to another node, the node is labeled a sending node; when a node receives a packet from a node, the node is labeled a receiving node; when a node received a packet and forwards the packet to another node, the node is labeled a forwarding node. Moreover, the node that receives packets from all the other nodes is labeled the root or sink node, and when a node receives packets from several other nodes, and then forwards the packets to the root node, the node is also labeled a forwarding node. The label of a particular node may depend upon the function of that node at that particular time, and may change over time as the function of the node changes. As such, a node may be at one time a sending node and at another time a receiving node or a forwarding node.

Various implementations provide a network routing method that includes initializing a network by determining, for each node of the network, a number of hops to a root node, and delaying sending and forwarding to the root node, for each node, a packet received, wherein the delays in sending and forwarding the packet to the root node from a forwarding node depends upon the determined number of hops separating the root node from the forwarding node.

Various implementations provide a network routing method that includes initializing a network by determining, for each node of the network, a number of hops to a root node, determining, for a forwarding node that receives a packet from a sending node, whether to forward the packet to a root node, determining a delay after which the packet is to be forwarded to the root node, and determining a probability of forwarding the packet to the root node.

Various implementations provide a network routing system that includes a controller, the controller initializing a network wherein, for each node of the network, a number of hops to a root node is determined, the controller determining whether to forward a packet from a forwarding node to root node, the controller delaying forwarding the packet to the root node, wherein the delay in forwarding the packet to the root node may depend upon the determined number of hops separating the root node from the forwarding node, and may depend upon a relative distance to the root node between the forwarding node and a sending node, and the controller determines a probability of forwarding the packet to the root node based on a number of times the forwarding node receives the packet.

Various implementations provide a machine readable medium that provides instructions for network routing, the instructions, when executed by a processor, cause the processor to perform operations that include initializing a network by determining, for each node of the network, a number of hops to root node, and delaying forwarding to the root node, for each node, of a packet received from a forwarding node or sending node, wherein the delay in forwarding the packet received to the root node depends upon the determined number of hops separating the root node from the forwarding node.

BRIEF DESCRIPTION OF THE DRAWINGS

Various exemplary implementations of systems and methods are described in detail, with reference to the following figures, wherein.

DETAILED DESCRIPTION OF EXEMPLARY EMBODIMENTS

Figure 1:
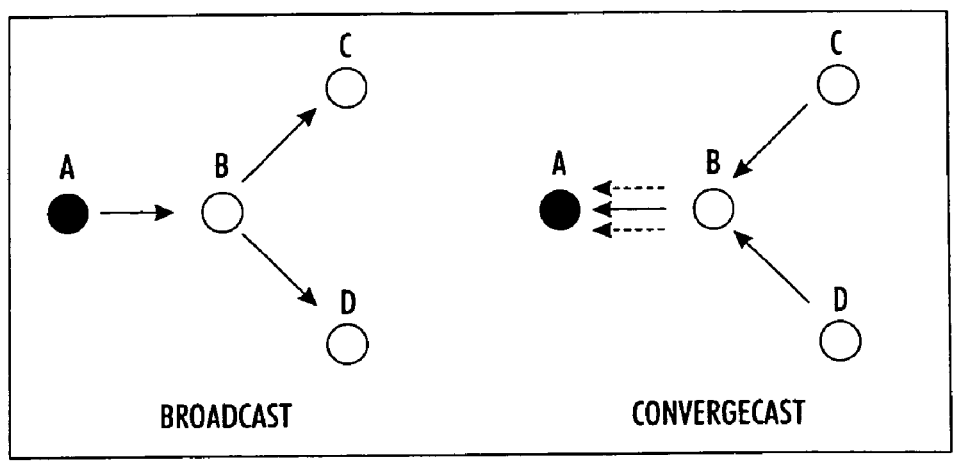
FIG. 1 is an illustration of an exemplary broadcast network and an exemplary convergecast network.
Figure 2:
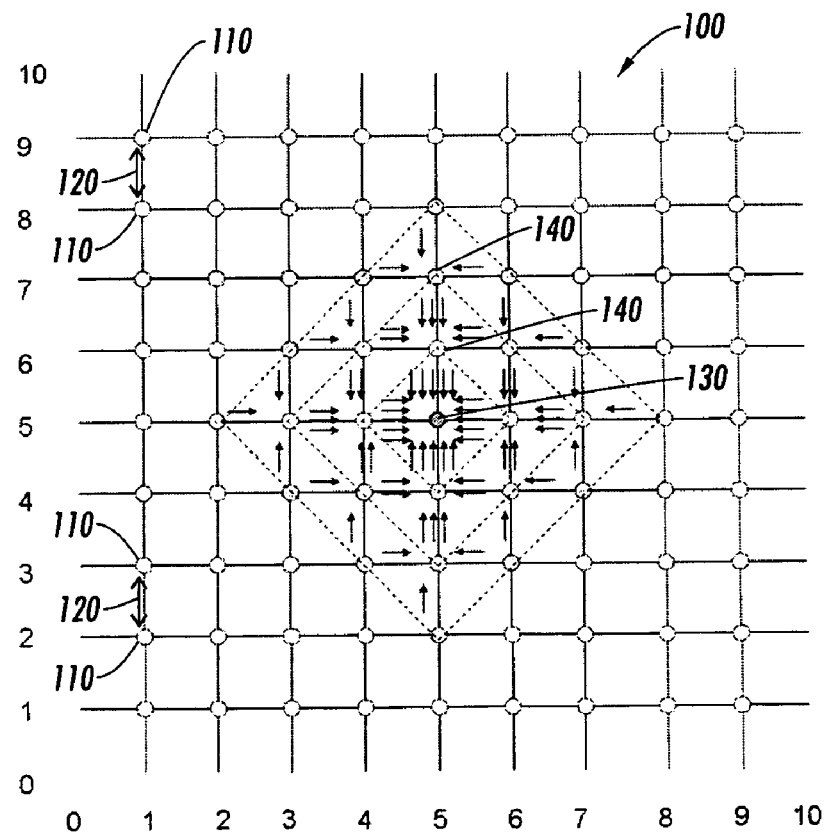
FIG. 2 is an illustration of an exemplary convergecast square lattice network.

FIG. 2 is an illustration of an exemplary convergecast square lattice network 100. In FIG. 2, the network 100 contains nodes 110 distributed in a square lattice configuration. The distance between each node 110 is a hop 120. In FIG. 2, various packets are being sent ultimately to the root node 130; however, forwarding nodes 140 receive packets from other nodes 110 and forward them to other forwarding nodes 140 before reaching the root node 130.

Temporal coordination is an exemplary strategy to reduce collisions and packet loss. Rather than sending a reply immediately after receiving a query, a node i 110 in the network will wait for time $T_i$ before sending the reply. This is expected to reduce the congestion around a root node 130 in a convergecast process. The period of time $T_i$ may be determined by using the "root-to-me" hop-distance available from a broadcast as a variable, and letting $T_i$ be $T(h_i)$, where $h_i$ is the hop distance 120 from the root node 130 to the node i 110 in the broadcast tree. T(h) is called the coordination function. The form of the coordination function T(h) may depend on the topology of the network 100. Intuitively, the further away a node 110 is from the root node 130, the more nodes need to send a reply before the node 110 does, so the longer the node 110 should wait before sending a packet in order to avoid unnecessary collisions.

In the square-lattice network 100 shown in FIG. 2, the number of nodes 110 that are h-hops away from each sink node 140 is 4 h. The total number of nodes 110 that are less than h-hops away from each sink node 140 is $$1+8+12+\ldots+4(h-1)=2h(h-1) \qquad (1)$$

Assuming that each node 110 sends a packet to a sink node 140 and no data aggregation occurs (e.g., the data is not compressed), and assuming that the average packet transmission time for one hop 120 is $\tau$, then the expected transmission time for all the packets initiated in less than h-hops 120 away from each sink node 140 to be received at each sink node 140 is:

$$t(h)=2h(h-1)\tau \qquad (2)$$

As a result, if the nodes 110 that are h-hops 120 away wait for a period of time t(h) before starting to send their packets, then the potential of collision with other packets that are generated in other nodes that are less than h-hops 120 away may be reduced significantly compared to sending the packets immediately after receiving a query without any delay t(h).

In a query-driven data collection scenario, the nodes reply to the root after receiving the query. On average, it takes $h\tau$ time for a node 110 h-hops 120 away from the root node 130 to receive a query. The nodes 110 one hop 120 away may send the reply immediately after receiving the query. As a result, if all transmissions are coordinated well, during the period of time $h\tau$, h−1 packets may have been received by the root node 130.

The nodes 110 that are h-hops 120 away may not need to wait until all the packets less than h-hops 120 away have been received to start transmitting, because their packets may take a period of time $h\tau$ to reach the root node 130. It is thus possible to refine and adjust the waiting time formula to be as follows:

$$t(h)=2h(h-1)\tau-(h-1)\tau-h\tau \qquad (3)$$

In an event-driven convergecast scenario, the nodes send data to the root in response to external events or stimuli, such as, for example, the sound of a gun shot, or environmental temperature change. In such scenarios, there is no explicit query immediately preceding the convergecast and the second term (h−1)$\tau$ does not exist, so the waiting time formula may be $t(h)=2h(h-1)\tau-h\tau$, instead. Also, in an event-driven convergecast scenario, the prior knowledge of the hop count h may come from a bootstrapping phase, so that the formula based on hop count is still practically applicable.

For general uniform networks, a quadratic form transmission delay function for replying to a query or responding to an event in any two-dimensional uniformly deployed network may be applied as follows:

$$t(h)=ah^2+bh+c \qquad (4)$$

where a, b and c are constants that may be obtained based on the application scenario such as query-based, event-driven, source rates, density, and the like.

However, according to this formula, all the nodes 110 at h-hops 120 away would send out their packets at the same time, which may cause collision at the sink nodes 140, even though all packets sent out by the nodes 110 that are less than h-hops away have already been received by each sink node 140 by that time. To take this factor into account, another term may be added, and thus:

$$T(h)=t(h)+Rh \qquad (5)$$

where R is a uniformly distributed random number.

Moreover, a local delay function may be used even when the network is not uniformly deployed, for example:

$$T(h) = \frac{d}{2}[h(h-1)+r]\tau \qquad (6)$$

where h is the number of hops 120 to a sink node 140, d is the local density that corresponds to the number of neighbors, and r is a random uniformly distributed variable between 0 and 1. The coordination strategy may be local and may depend only on the information at a particular node 110.

Constrained flooding is a routing strategy that is developed for wireless sensor networks. It is being applied to various applications, including, for example, convergecast, and has shown to have overall high performance metrics, high success rates and low energy consumption.

Constrained flooding in general has an initialization phase and a routing phase. The initialization phase establishes a "potential field" propagating from the root node 130. In query-based scenarios, the initialization may take place at the time of query broadcasting. In event-driven scenarios, the initialization may take place during the bootstrapping phase. Each node 110 maintains the distance value from the node 110 to the sink node 140. This value may be obtained at the initialization and may also be acquired during the routing process. During the routing process, each node 110 may rebroadcast the received packet only if the node 110 is not too much further away from the root node 130 than the node that sent the packet to the node 110, or sender node. Furthermore, a delay may be added so that the node 110 with a shorter distance transmits earlier, and a probabilistic suppression mechanism may also be applied. Each packet may contain a number indicating how far away the sender node is expected to be from the root node 130. When a node 110 hears a packet which is sent or relayed by a sending node that is further away from the root node 130, then the node 110 may try to forward the packet in a probabilistic manner. The node 110 may wait for a period of time according to its relative distance to the sink node 140 before forwarding the packet. This waiting period may correspond to the relative distance rather than the absolute distance that was used in the temporal coordination heuristics method described above. If during the waiting period, the node 110 hears or receives the same packet N times, then the packet will be forwarded with a probability of 1/N.

Combining the temporal coordination heuristic method with the constrained flooding method, the delayed period of transmission may be set according to the delay function in equation (6) above. The probabilistic suppression mechanism may be used to further reduce collision and improve efficiency.

Figure 3:
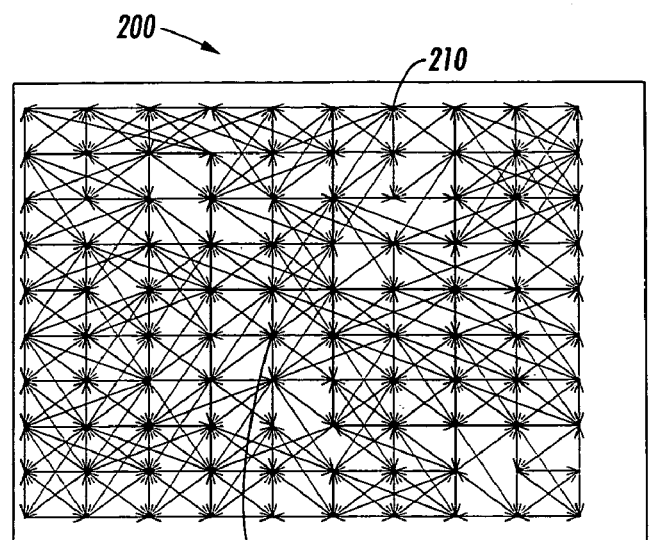
FIG. 3 is an illustration of an exemplary 10×10 network.

FIG. 3 is an illustration of an exemplary 10×10 network 200. A first experiment was performed on a uniformly deployed network 200 with all the nodes 210 sending almost at the same time such as, for example, within 0.25 seconds. This example is used for theoretically analyzing the tradeoffs among latency, throughput, success rates and energy consumption. A set of performance metrics may be developed to compare different routing algorithms, including latency, throughput, success rates, energy consumption, and the like.

The latency of a packet measures the time delay of the packet from the source to the destination. For any destination, if n packets have arrived, the latency for that destination is given by $\Sigma_i d_i/n$ where $d_i$ is the latency of the ith packet. The latency of the network 200 is then averaged by the number of destinations. Latency, rather than the number of hops, may be used as the metric because latency consists of not just the number of hops, but also the length of transmission queues, the random delays at the MAC layer, and deliberately added delays in routing algorithms to avoid collisions.

Throughput at a destination measures the number of packets per second received at the destination. The throughput of the network 200 may be the sum of the throughputs from all destinations. The success rate of a network 200 measures the total number of packets received at all the destinations compared to the total number of packets sent from all the sources. The energy consumption of the network 200 is the sum of used energy of all the nodes in the network 200. Each transmission is assumed to consume energy proportional to its signal strength. For simplicity, the energy involved in receiving and idling communication may be ignored. Therefore, the energy consumption is proportional to the total number of packets sent in the network 200.

Figure 4:
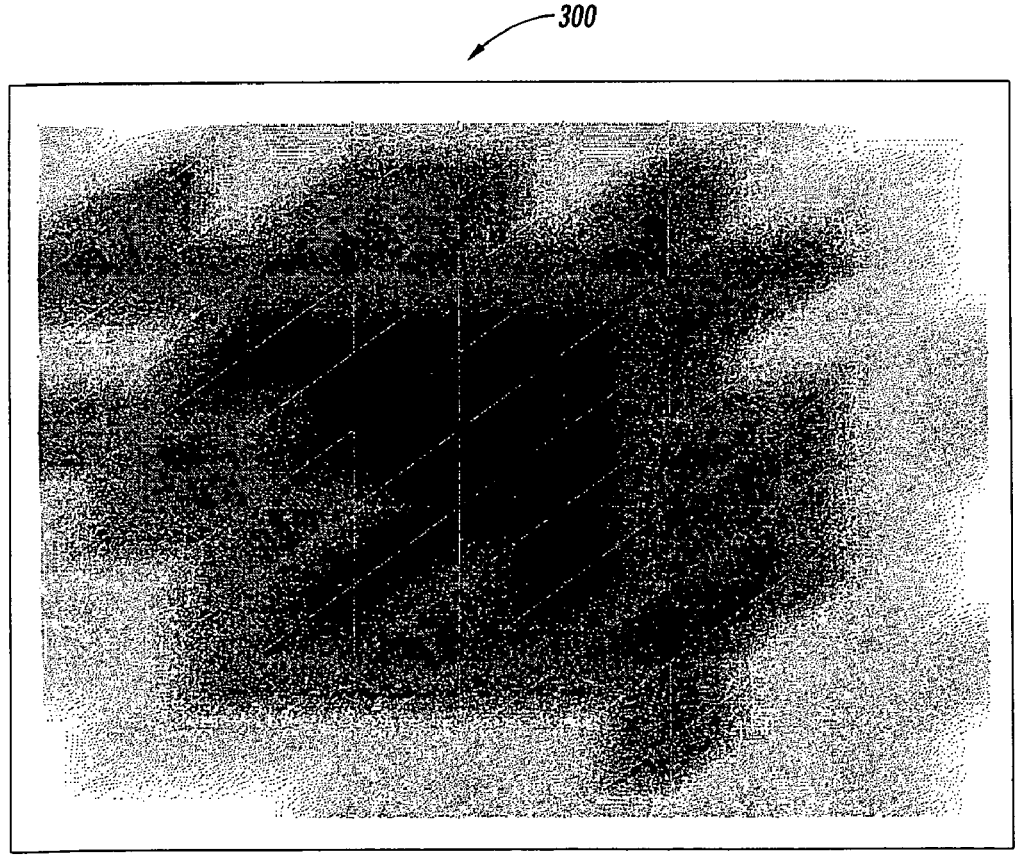
FIG. 4 is an illustration of a potential field for constrained flooding.

A simulation was performed on the uniformly deployed 10×10 network 200 shown in FIG. 3. Not only is the connectivity not symmetric ($\sigma_\alpha=0.45$), but there is also a small dynamic variance ($\sigma_\beta=0.02$) and a probability of error ($P_{error}=0.05$). A sink 220 is assumed to be at the center of the network 200. After the initialization phase, a potential field for constrained flooding, as illustrated in FIG. 4 by a potential field 300, may be established. Every node may be assumed to need to send out a packet within a 0.25 second time frame, for example. Using the radial coordination scheme, the actual sending may be delayed according to the temporal coordination heuristic described in equation (6). The delay of transmission may be recorded in the latency metric. By varying the delay coefficient τ in equation (6), the latency and the success rate may be controlled.

Figure 5:
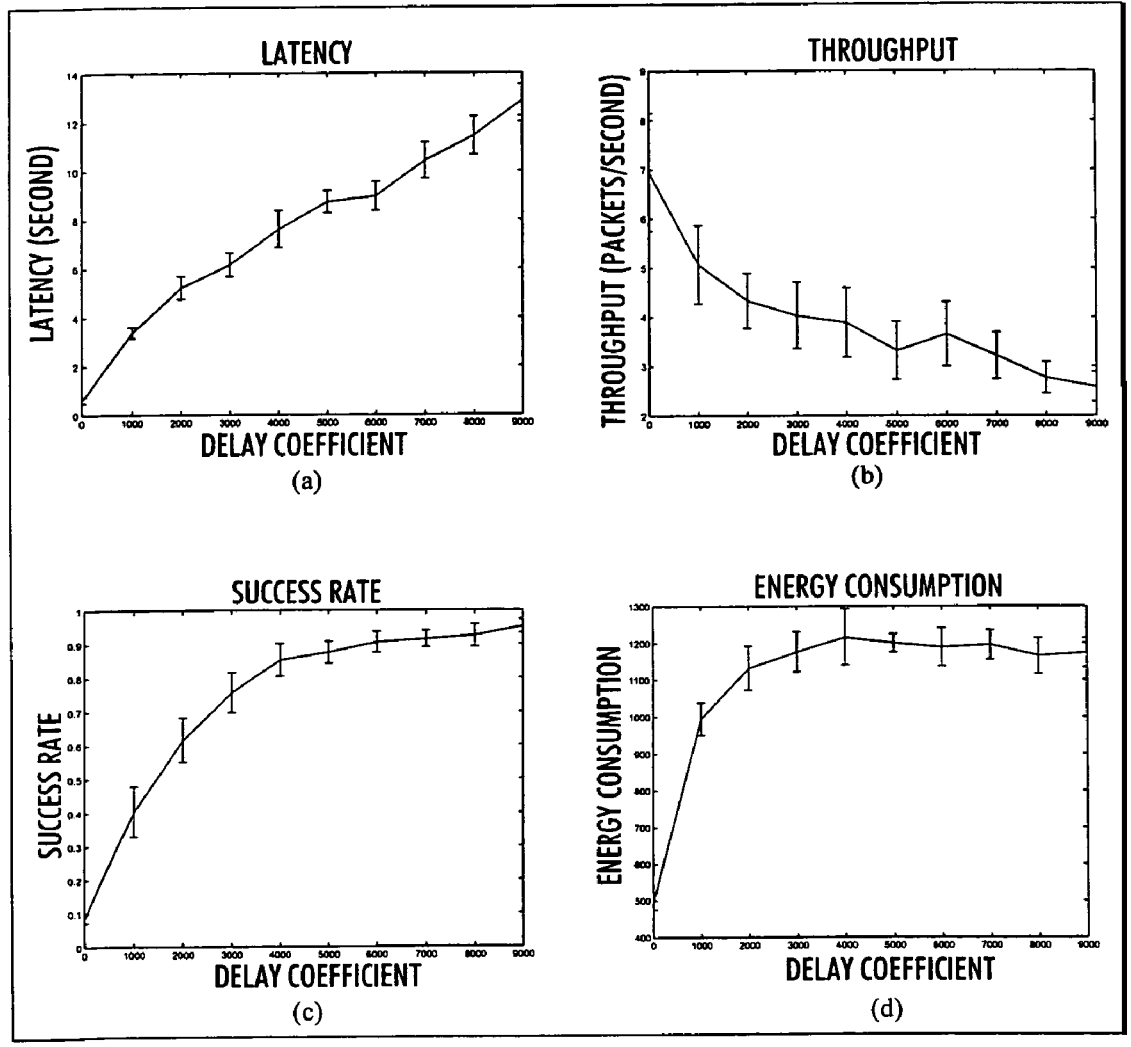
FIG. 5 is a series of charts illustrating an exemplary trade-off of performance metrics using radial coordination.

FIG. 5 shows a series of charts illustrating the tradeoff of performance metrics using radio coordination. For a total of 10 random runs, FIGS. 5 (a)-(d) show the performance metrics with respect to the delay coefficient τ, which varies from 0 to 9000. The results show that with the increase of τ, the success rate increases; however, the latency also increases, and the throughput decreases. Without using the radial coordination (i.e. τ=0), the success rate is less than 10 percent. Using radial coordination, the success rate may be as high as 90 percent or more. For different applications with different performance requirements, one may select the best τ that fits the purpose. For example, if high success rates are important, one may want to increase τ; on the other hand, if a high throughput or a low latency is important, one may choose a small τ instead.

Figure 6:
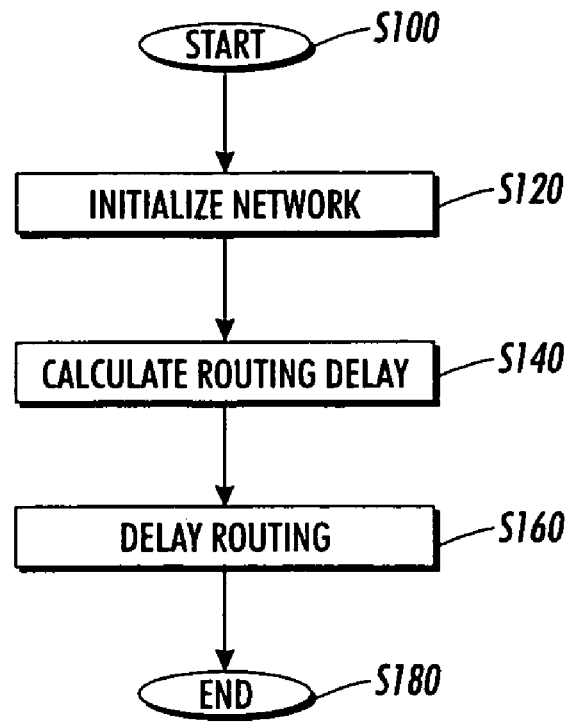
FIG. 6 is a flowchart illustrating an exemplary network routing method.

FIG. 6 is a flowchart illustrating an exemplary method of network routing. In FIG. 6, the method starts in step S100, and continues to step S120. During step S120, the network is initialized by determining, for each node of the network, a number of hops that separate the node and the root node. As such, a map of the network may then be inferred from the initialization step. Next, control continues to step S140, where a routing delay is calculated. During step S140, the routing delay is calculated, for example, as illustrated in equations 3, 4, 5 and 6. The delay in forwarding the packet received from a forwarding node to the root node may depend upon the number of hops that separate the root node from the forwarding node. Next, control continues to step S160, where a packet received by a node is delayed by the delay calculated during step S140 before being forwarded to the root node. Next, control continues to step S180, where the method ends.

Figure 7:
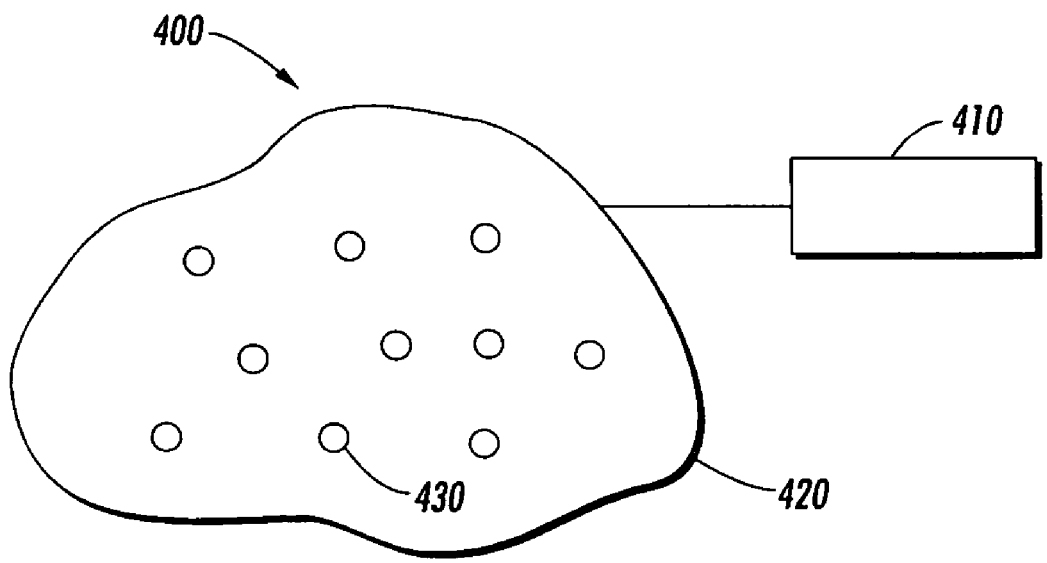
FIG. 7 is an illustration of an exemplary network routing system.

FIG. 7 is a schematic illustration of an exemplary network routing system 400. In FIG. 7, a controller 410 controls the initialization of a network 420 and controls the determination, for each forwarding node 430, and based on the number of hops between nodes, of the routing delays and the probability of forwarding a given packet.

Figure 8:
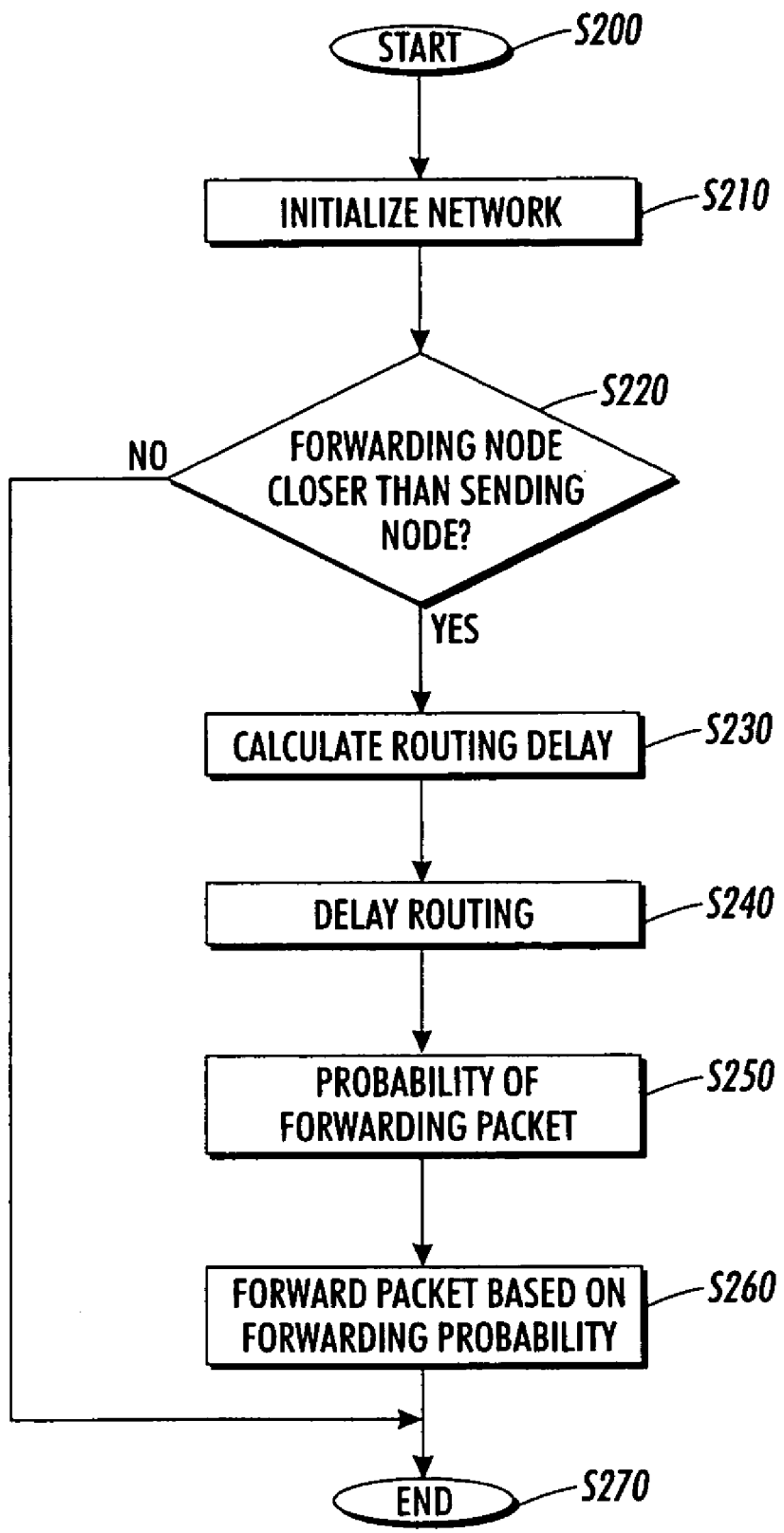
FIG. 8 is a flowchart illustrating another exemplary network routing method.

FIG. 8 is a flowchart illustrating another exemplary method of network routing. In FIG. 8, the method starts in step S200 and continues to step S210. During step S210, the network is initialized by determining, for each node of the network, the number of hops that separate the node and the root node. Thus, a map of the network may be inferred. During step S210, the initialization of the network may take place either at the time of query broadcasting, for example, in the case of query-driven routing, or at the time of bootstrapping, for example, in the case of event-driven routing. Next, control continues to step S220, where a determination is made of whether to forward the packet to the root node or whether to flush or discard the packet. The determination of whether to forward the packet to the root node may be based on the relative distance to the root node between the forwarding node and the sending node. If the forwarding node is further from the root node than the sending node, then the packet is not forwarded to the root node and is discarded. However, if the distance of the forwarding node to the root node is shorter than the distance of the sending node to the root node, then the packet is forwarded to the root node. Next, control continues to step S230, during which a routing delay is calculated.

In step S230, the routing delay may be calculated as being shorter for a forwarding node that is closer to the root node compared to a forwarding node that is further to the root node. Next, control continues to step S240, where forwarding of the packet is delayed based on the routing delay calculated during step S230. Next, control continues to step S250, during which a probability of forwarding the packet is calculated. Determining the probability of forwarding the packet during step S250 may depend on the number of times that the forwarding node has received (i.e., heard) the same packet. Accordingly, the probability of forwarding the packet to the root node may be determined as being inversely proportional to the number of times the forwarding node has heard the same packet, such as, for example, the reciprocal of the number of times the forwarding node has heard the same packet. Next, control continues to step S260, where the packet is forwarded after the routing delay and based on the forwarding probability that was calculated during S250. Next, control continues to step S270, where the method ends.

While the disclosure has been described in conjunction with exemplary implementations, these implementations should be viewed as illustrative, not limiting. Various modifications, substitutes, or the like, are possible in view of this disclosure.

What is claimed is:

1. A network routing method, comprising:
   initializing the network by determining, for each node of the network, a number of hops to a root node; and
   delaying forwarding to the root node, for each forwarding node, a packet received from a sending node, the forwarding node receiving the packet from the sending node and forwarding to the root node, wherein
   the delay in forwarding the received packet to the root node from the sending node depends upon the number of hops separating the root node from the forwarding node.

2. The method of claim 1, wherein:
   the delay is defined as $t(h)=ah^2+bh+c+r$, wherein a, b and c are constants and r is a uniformly distributed random number.

3. The method of claim 1, wherein:
   the delay is defined as $t(h)=d/2[h(h-1)+r]\tau$, wherein d is a local density corresponding to a number of neighbors of a given node and r is a random uniformly distributed variable.

4. The method of claim 1, wherein:
   the network is a square-lattice network; and
   the delay is defined as $t(h)=2h(h-1)\tau$, wherein h is the number of hops and $\tau$ is an average transmission time for one hop.

5. The method of claim 1, wherein:
   the network is a square-lattice network; and
   the delay is defined as $t(h)=2h(h-1)\tau-(h-1)\tau-h\tau$, wherein h is the number of hops and $\tau$ is an average transmission time for one hop.

6. A network routing method, comprising:
   initializing the network by determining, for each node of the network, a number of hops to a root node;
   determining, for a forwarding node that receives a packet from a sending node, whether to forward the packet to the root node;
   determining a delay, by the forwarding node, after which the packet received by the sending node is to be forwarded by the forwarding node to the root node; and
   determining a probability of forwarding the packet to the root node and forwarding the packet to the root node based on the determined probability.

7. The method of claim 6, wherein initializing the network takes place at a time of query broadcasting.

8. The method of claim 6, wherein initializing the network takes place at a time of bootstrapping.

9. The method of claim 6, wherein determining whether to forward the node to the root node is based on a relative distance to the root node between the forwarding node and the sending node.

10. The method of claim 9, wherein the packet is not forwarded to the root when the forwarding node is further from the root node than the sending node.

11. The method of claim 6, wherein the delay is determined based on a relative distance to the root node between the forwarding node and the sending node.

12. The method of claim 11, wherein the delay is shorter when the forwarding node is closer to the root node.

13. The method of claim 6, wherein determining the probability of forwarding the packet to the root node is based on a number of times the forwarding node receives a same packet.

14. The method of claim 13, wherein the probability of forwarding the packet to the root node is inversely proportional to the number of times the forwarding node receives the same packet.

15. The method of claim 13, wherein the probability of forwarding the packet to the root node is 1/N, wherein N is the number of times the forwarding node receives the same packet.

16. A network routing method, comprising:
   initializing the network by determining, for each node of the network, a number of hops to the root node;
   determining, for a forwarding node that receives a packet from a sending node, whether to forward the packet to the root node;
   delaying forwarding the packet received from the sending node by the forwarding node to the root node, wherein the delay in forwarding the received packet to the root node depends upon the number of hops separating the root node from the forwarding node and depends upon a relative distance to the root node between the forwarding node and the sending node; and
   determining a probability of forwarding the packet to the root node and forwarding the packet to the root node based on the determined probability.

17. A network routing system, comprising:

a controller;

the controller initializing the network such that, for each node of the network, a number of hops to a root node is determined;

the controller determining whether to forward a packet received from a sending node from a forwarding node to the root node;

the controller delaying forwarding the packet received from a sending node by the forwarding node to the root node, wherein the delay in forwarding the packet to the root node depends upon the number of hops separating the root node from the forwarding node and depends upon a relative distance to the root node between the forwarding node and the sending node;

the controller determining a probability of forwarding the packet to the root node based on a number of times the forwarding node receives the packet; and the controller forwarding the packet to the root node based on the determined probability.

18. A machine-readable medium that stores instructions provided for network routing, the instructions, when executed by a processor, cause the processor to perform operations comprising:

initializing the network by determining, for each node of the network, a number of hops to a root node; and delaying forwarding to the root node, for each forwarding node, a packet received from a sending node, the forwarding node receiving the packet from the sending node and forwarding to the root node, wherein the delay in forwarding the packet received to the root node from the forwarding node depends upon the number of hops separating the root node from the forwarding node.

19. A machine-readable medium that stores instructions provided for network routing, the instructions, when executed by a processor, cause the processor to perform operations comprising:

initializing the network by determining, for each node of the network, a number of hops to a root node;

determining, for a forwarding node that receives a packet from a sending node, whether to forward the packet to the root node;

determining a delay after which the packet received from the sending node is to be forwarded by the forwarding node to the root node; and determining a probability of forwarding the packet to the root node and forwarding the packet to the root node based on the determined probability.

* * * * *